United States Patent Office 3,263,693
Patented August 2, 1966

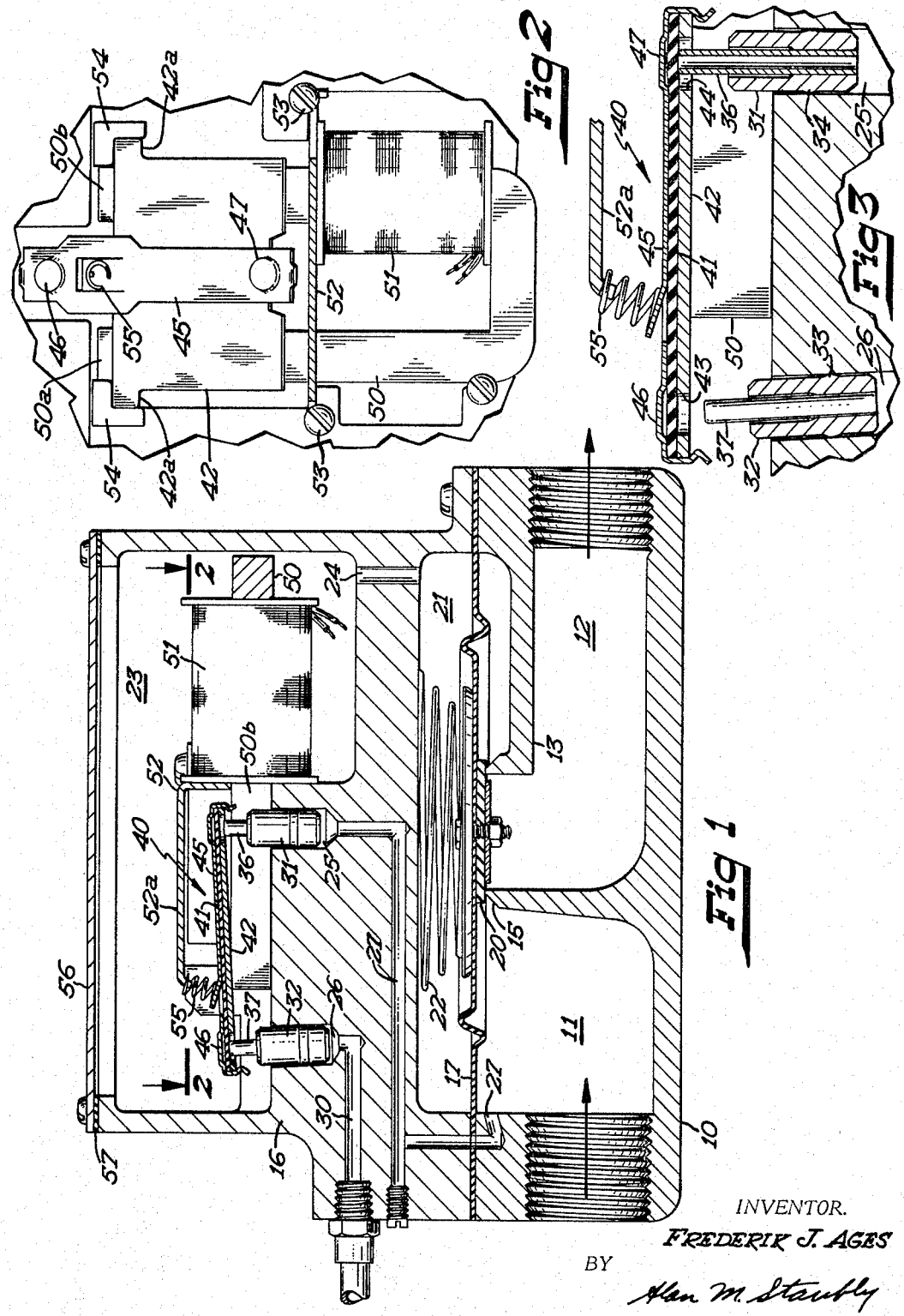

3,263,693
PILOT CONTROL VALVE AND METHOD
OF MAKING SAME
Frederik J. Ages, Rolling Hills Estates, Calif., assignor to
Honeywell Inc., a corporation of Delaware
Filed Dec. 31, 1964, Ser. No. 422,817
7 Claims. (Cl. 137—15)

This application relates to control apparatus and more specifically, to a fuel control valve. In particular, it relates to an improved diaphragm controller or pilot valve for controlling a main flow control valve and to a method for making the pilot valve.

It is known to use pilot valves for controlling a main valve and it is known that these pilot valves may take a number of forms. The pilot valve of this invention is of the type wherein one or more nozzles extend into a chamber and wherein the flow of fluid through these nozzles is controlled by a control member which is moved with respect thereto. By way of example, the pilot valve may have a chamber which is connected, or adapted to be connected, to the operating chamber of the valve to be controlled thereby. A pair of nozzles is disposed within the chamber with one of these nozzles connected to a source of fluid pressure and the other connected to exhaust. A control member is mounted within the chamber and is operable to selectively close one of the nozzles to prevent fluid flow therethrough and to open the other. An operator, such as an electromagnetic operator, may be utilized to reverse the position of the control member so as to open the first one of the nozzles and to close the second. By so doing, the chamber in the pilot valve is selectively connected either to fluid under pressure or to exhaust, and since this chamber is adapted to be connected to the operating chamber of the valve being controlled, such operating chamber is thereby selectively connected either to pressure or exhausts to accomplish the operation of a main control valve.

It has been customary, in a pilot valve of this type, to utilize nozzles which are machined from a metal such as brass, steel, aluminum or the like and then to provide the lower portion of the nozzle member with a threaded portion which is threaded into an opening in the body of the pilot valve. In some instances various other means of securing the machined nozzle in the valve body have been utilized. Since a pilot valve of this type is, in many instances, extremely small, the machining of these nozzles has involved a fairly large amount of intricate work and therefore have been expensive. In addition, the nozzle has had to be threaded as has the opening in the valve body where it is to be mounted. The nozzles are commonly adjusted in the body by adjusting the depth to which they are threaded into the body. Thus, not only has the machining of the nozzles been costly, but also the assembly of the pilot valve has been time consuming and costly as well. The extremely small size of many such valves has added to the difficulty of assembly. Various types of closure members have been utilized for cooperation with the nozzles. Generally it has been found desirable to use some type of a soft material to seat against the end of the nozzle if complete shutoff is desired. Nevertheless sealing problems have existed in many instances.

I have provided an improved pilot valve of the type described which utilizes a nozzle construction which is considerably less expensive than those previously used in that the nozzles do not require machining. Also the nozzles are readily adapted to be mounted in the valve body and adjusted therein by automatic machinery, thus greatly reducing the expense of assembly. My invention includes not only the structural configuration of the pilot valve, but also the method of constructing and assembling this improved and cost reduced valve. In addition, I have provided an improved closure member which cooperates with the nozzles and provides positive shutoff when moved into engagement with one of the nozzles. This closure member is simple in construction and inexpensive but assures ready flexing of the portion which engages the ends of the fluid nozzles to assure a good seal therewith.

Therefore, an object of my invention is to provide an improved pilot valve of the type utilized to control a main fluid control valve.

A further object of my invention is to provide an improved pilot valve of the type having fluid nozzles mounted therein and adapted to be controlled by a movable control member and wherein the nozzles are so constructed as to eliminate the need for machining thereof and wherein they are assembled with the valve body in a manner which greatly simplifies assembly and reduces the cost thereof.

A still further object of my invention is to provide, in a pilot valve of the type described, a nozzle construction wherein assembly and adjustment of the nozzle with respect to the valve body is readily accomplished by automatic machinery to reduce the cost of assembly.

Another object of my invention is to provide, in a pilot valve of the type described, an improved closure member adapted to cooperate with the fluid nozzles in the pilot valve and to assure positive shutoff of the nozzles when moved into engagement therewith.

A still further object of my invention is to provide an improved method of making a pilot valve of the type described.

These and other objects of my invention will become apparent upon reading the following detailed description of a preferred embodiment thereof with reference to the drawing wherein:

FIGURE 1 is a longitudinal cross sectional view taken generally through the center of a fuel control valve utilizing the pilot valve of my invention.

FIGURE 2 is a fragmentary view disclosing an electromagnetic operator and valve closure member utilized in the pilot valve and taken generally along line 2—2 in FIGURE 1.

FIGURE 3 is an enlarged fragmentary view disclosing the nozzle construction and the closure member which cooperates with the nozzles in a valve constructed according to my invention.

Referring first to FIGURE 1, numeral 10 refers to a first body member having an inlet chamber 11 and an outlet chamber 12 separated by a wall 13 which has formed therein a port surrounded by a valve seat 15. A second body member 16 is mounted immediately above body member 10 and is attached thereto by appropriate means. Clamped between body members 10 and 16, at its peripheral edges, is a diaphragm 17 carrying a valve closure member 20 which cooperates with the valve seat 15. Above diaphragm 17, body member 16 has an operating chamber 21 in which there is mounted a spring 22 which urges the diaphragm toward the inlet chamber 11 and normally seats valve closure member 20 on seat 15. Body member 16 has formed therein a pilot chamber 23 which is connected to operating chamber 21 by appropriate means, such as a passage 24. Body member 16 also has formed therein a pair of spaced generally cylindrical openings 25 and 26 which extend from the chamber 23. Opening 25 is connected to inlet chamber 11 by appropriate means such as a passage 27 formed in body member 16, extending through diaphragm 17 and through body member 10. Opening 26 is connected to a passage 30 which is adapted to be connected to exhaust. For example, passage 30 may be fitted with a pipe which leads to a position adjacent the burner being provided with gas through the valve or to some other low pressure area such as the downstream side of the valve.

Pressed tightly into openings 25 and 26 are bushings 31 and 32, respectively. These bushings are generally cylindrical in shape and have an outside diameter which is slightly less than the diameter of the openings 25 and 26. The bushings are formed from a relatively soft and deformable material such as aluminum and are provided with outwardly extending annular flanges 33 and 34 respectively. These flanges have an outer diameter which is greater than the diameter of the openings 25 and 26 and, when the bushings are pressed into the openings, the flanges provide a fluid-tight seal with the body surrounding the openings and also are deformed sufficiently so that the bushings are rigidly mounted in the body. Each of the bushings 31 and 32 has a central opening therethrough which is preferably cylindrical in shape and generally coaxial with the bushing. As best seen in FIGURE 3, these openings may be slightly larger adjacent the upper end of the bushings than at the lower end of the bushings. Into these openings are pressed short pieces of a hard thin-walled tubing having a relatively small opening therethrough. In the preferred embodiment, these pieces of tubing which provide the nozzles for the pilot valve, and which are designated by numerals 36 and 37, respectively, are formed from surgical steel tubing. The nozzles 36 and 37 extend upward from the upper end of their respective bushings and extend into the chamber 23. These nozzles are adapted to cooperate with a closure member which forms a part of an armature assembly generally designated by the numeral 40.

While any form of closure member may be used to cooperate with the nozzles, I prefer to use the improved closure member disclosed in FIGURES 1 and 3. Here the closure member takes the form of a diaphragm-like member 41 carried by a magnetic armature 42. Armature 42 is pivoted in the chamber 23 in a manner which will be described hereinafter and is disposed generally above the nozzles 36 and 37. It is adapted to be selectively operated to close either one or the other of the nozzles. With reference to FIGURES 2 and 3, armature 42 is a relatively long, flat member formed of magnetic material and having a generally rectangular main portion with a narrower, neck-like portion extending forward over nozzle 37 and a somewhat shorter neck-like portion extending rearwardly over nozzle 36. The armature has an opening 43 disposed above nozzle 37 and an opening 44 disposed above nozzle 36. The member 41 is a relatively thin, flat piece of a flexible diaphragm-like material which is laid along the surface of the armature 42 on the side which is facing away from the nozzles. Disposed above the member 41 is a retaining member 45 which takes the form of a relatively long, narrow strip of material, such as metal and which extends along the full length of the armature and sandwiches the closure member 41 between the retaining member and the armature. The ends of the retaining member are clipped around the ends of the armature and thereby hold the armature, the closure member, and the retaining member tightly together to define an armature assembly. Opposite the openings 43 and 44 in the armature, retaining member 45 has outwardly struck dimples 46 and 47, respectively. These dimples provide a void between the retaining member and the closure member 41 so that the closure member can readily flex when it seats against one of the nozzles. This assures that the nozzle will be completely closed off when the closure member is moved against it.

Armature member 42 can best be seen by referring to FIGURE 2 which is a fragmentary view with certain parts removed for clarity. As seen there, the armature has an outwardly extending tab or ear 42a on either side thereof and coextensive with its forward edge. Mounted in the chamber 23 is an electromagnetic operator for the armature which can also be best seen by referring to FIGURE 2. While the closure member and the manner in which it is operated is somewhat different, the magnetic structure of the operator which I use is generally similar to that disclosed in Patent 3,027,498, issued to Paul Dietiker and Hugh M. Morgan and assigned to the assignee of the present invention. Briefly stated, the magnetic actuator comprises a generally U-shaped magnetic member 50 having a pair of legs 50a and 50b. Wound about the leg 50b is an electrical coil 51 which may be connected to an appropriate source of electrical power through a control device such as a thermostat (not shown). Magnetic member 50 may be held in place within the chamber 23 by appropriate means, such as a member 52, which has a portion extending transversely of the legs and bearing down on the upper surface thereof. Member 52 may be attached to the body by appropriate means, such as screws 53. Member 52 also has a forwardly extending neck-like portion 52a which is generally parallel to and spaced above the legs 50a and 50b of the magnetic member 50.

Intermediate the legs 50a and 50b and the portion 52a of the retaining member 52, is the armature 42. The tabs 42a, at the forward edge of the armature, engage, with their forward and outside edges, the inner surfaces of a pair of upstanding portions 54 of body member 16. These upstanding portions 54 have a generally L-shaped cross section and limit the forward and transverse movement of the armature. The under surface of the forward edge of the armature 42 acts as a pivot upon the legs 50a and 50b of the magnetic member 50. A small spiral spring 55 is compressed between the outer end of portion 52a of member 52 and the upper surface of the retaining member 45 which is clamped to the armature. As best seen in FIGURE 1, this spring engages the armature assembly adjacent its outer end and at an angle so as to urge the tabs 42 into engagement with the portions 54 of the housing and to pivot the armature assembly so that the closure member 42 engages the end of nozzle 37 and closes it off and so that the nozzle 36 is open.

When the coil 51 is energized, the armature is attracted to the legs 50a and 50b and consequently the armature is pivoted about its forward edge so that nozzle 37 is opened and nozzle 36 is closed. FIGURE 1 discloses the armature in its normal position with the coil 51 de-energized and with spring 55 urging the armature assembly to a pivotal position which closes nozzle 37 and opens nozzle 36. FIGURE 3 discloses the armature assembly disposed in the pivotal position which it assumes when the coil 51 is energized, that is, with nozzle 36 closed and nozzle 37 open.

Obviously, if the armature assembly is to properly engage nozzles 36 and 37 when it is pivoted to the appropriate position, the upper end of these nozzles should not be disposed in the same plane. As can best be seen in FIGURE 3, I choose to have nozzle 36 extend generally vertically and normal to the plane of the armature assembly when in its activated position with the coil energized. The opening 26 in the body member 16 is disposed at a slight angle with the vertical so that when nozzle 37 is mounted therein it is disposed so as to be generally normal to the armature assembly when it is in the position to which it is urged by spring 55.

Chamber 23 may be covered by a cover member 56 which is attached thereto and which may be sealed by a gasket 57.

The operation of the valve described is thought to be apparent but briefly is as follows:

With the valve in the position disclosed in FIGURE 1, fluid pressure enters inlet chamber 11 of the main valve and passes through passage 27 and nozzle 36 into the pilot valve chamber 23. This chamber is connected to operating chamber 21 of the main valve and consequently chamber 21 is also provided with gas at inlet pressure. This pressure, along with the force of spring 22, urges the valve to a closed position. If coil 51 is energized, the armature 42 is pivoted to a position wherein nozzle 36 is closed and nozzle 37 is open. Since nozzle 37 is connected to exhaust by passage 30, the operating chamber 21 is thereby connected to exhaust and consequently the inlet pressure acting on the underside of diaphragm 17 moves it upward against the force of spring 22.

In assembling my improved pilot valve, it is simply necessary to drill the openings 25 and 26 in the valve body at the desired spaced positions. Then, nozzles 36 and 37 are cut to the desired length from the surgical steel tubing and are pressed into the openings in the bushings 31 and 32, respectively, which, as noted above, are formed of a relatively soft material such as aluminum. The upper end of each nozzle is left extending above the upper end of the bushings. Then, the bushings are pressed into the opening in the body to a depth which will result in the upper end of the nozzles extending to the correct position for cooperation with the armature assembly for controlling fluid flow through the nozzles. As noted, there is an interference fit between the radial flanges 33 and 34 on bushings 31 and 32, respectively, and these provide a fluid-tight seal between the bushings and the body and also render the bushings rigidly mounted in the body. This assembly is readily adaptable to automatic assembly machines which press the bushings into the body to the precise depth required for an accurate positioning of the nozzles and hence they require no further adjustment.

Thus, it can be seen that this structure provides the required nozzles without the usual cost of machining the very small nozzle members and then threading them into the body and also, due to the fact that it is readily adaptable for automatic assembly, the cost of assembly is greatly reduced. Further, since the bushings are automatically pressed into the body by a machine, the depth to which these bushings are pressed into the body can easily be controlled so that the nozzles require no additional adjustment to render them cooperable with the valve closure portion of the armature assembly.

From the foregoing, it can be seen that my invention provides an improved pilot valve construction which is simple and inexpensive to manufacture without scarificing the operating characteristics necessary in such valves. In addition, the closure arrangement of the armature assembly which is utilized to coact with the nozzles in the preferred arrangement is a relatively inexpensive construction which assures positive sealing when the closure portion is brought into engagement with either of the nozzles.

While I have disclosed a specific embodiment of my invention herein, it is to be understood that this is by way of explanation only and not intended to limit my invention. The improved pilot valve construction has been disclosed as being built into a body member which actually forms an upper part of the body for a main valve. Obviously, the pilot valve assembly may be a completely separate unit connected to the valve to be controlled by appropriate piping or the like. Also, it is to be understood that the structure of the valve being controlled by the pilot valve may take any form desired and that shown and described herein is by way of example. Various modifications may therefore become apparent to those skilled in the art upon their becoming familiar with my disclosure herein. It is therefore intended that my invention should be limited solely by the scope of the appended claims.

I claim:

1. A pilot valve comprising: a valve body having a chamber therein and a pair of spaced openings communicating with said chamber; a pair of bushings each formed of a relatively soft deformable material and having a shape corresponding to that of said openings and each having a relatively small longitudinal opening extending therethrough; a pair of fluid nozzles each consisting of a relatively short length of relatively hard, thin-walled hollow tubing, each of said nozzles being press-fitted into the opening in one of said bushings to form a fluid-tight seal therewith and having one end extending beyond one end of the bushing, each of said bushings being press-fitted into one of the openings in said body to form a fluid-tight seal with said body and with the extending end of the nozzle mounted therein extending a predetermined distance into said chamber; a first fluid passage connected to one of the openings in said body, communicating with the interior of the nozzle mounted therein, and adapted to be connected to a source of fluid pressure; a second fluid passage connected to the other of said openings in the body, communicating with the interior of the nozzle mounted therein, and adapted to connect the nozzle to a low pressure area; an armature formed of a relatively flat piece of magnetic material and with a length greater than the distance between said nozzles, said armature having a pair of openings therethrough spaced so that each opening is adapted to receive one of said nozzles; a strip of relatively thin, readily deformable material disposed along one side of said armature and overlying said openings; a retaining member disposed adjacent said deformable material and clipped to said armature with said deformable material sandwiched tightly between said retaining member and said armature, said retaining member having a dimple extending away from said deformable material to leave a void therebehind opposite each of the openings in said armature; means pivotally mounting said armature in said chamber in cooperating relationship with said nozzles; yieldable spring means urging said armature to a pivotal position wherein one of said nozzles extends through one of the openings in said armature and is closed by the deformable material therein and the other of said nozzles is open; and electromagnetic means operable to move said armature to another pivotal position wherein said one nozzle is opened and said other nozzle extends into the other opening in said armature and is closed by the deformable material therein.

2. A pilot valve comprising: a valve body having a chamber therein and a pair of spaced openings communicating with said chamber; a pair of bushings each formed of a relatively soft deformable material and having a shape corresponding to that of said openings and each having a relatively small opening extending therethrough; a pair of fluid nozzles each consisting of a relatively short length of relatively hard, thin-walled hollow tubing, each of said nozzles being press-fitted into the opening in one of said bushings to form a fluid-tight seal therewith and having one end extending beyond one end of the bushing, each of said bushings being press-fitted into one of the openings in said body to form a fluid-tight seal with said body and with the extending end of the nozzle mounted therein extending a predetermined distance into said chamber; a first fluid passage connected to one of the openings in said body, communicating with the interior of the nozzle mounted therein, and adapted to be connected to a source of fluid pressure; a second fluid passage connected to the other of said openings in the body, communicating with the interior of the nozzle mounted therein, and adapted to connect the nozzle to a low pressure area; valve closure means movably mounted in said chamber and adapted to selectively engage said nozzle members to prevent fluid flow therethrough; spring means yieldingly urging said closure means into engagement with one of said nozzles and away from the other of said nozzles; and magnetic means operably associated with said closure means and operable to move said closure means out of engagement with said one of said nozzles and into engagement with said other of said nozzles.

3. In a pilot valve of the type wherein a control member cooperates with a fluid nozzle, the improved construction comprising: a valve body having a chamber therein and an elongated opening in the body communicating with said chamber and in close proximity to the control member; a bushing formed of a relatively soft deformable material having a shape corresponding to that of said opening and having an opening extending therethrough; a fluid nozzle consisting of a length of relatively hard, thin-walled hollow tubing, said nozzle being press-fitted into the opening in said bushing to form a fluid-tight seal therewith and having one end extending beyond one end of the bushing, said bushing being press-fitted into said opening in the body to form a fluid-tight seal with said body and with the extending end of the nozzle mounted therein extending a predetermined distance into said chamber; and a fluid passage connected to the opening in said body and communicating with the interior of said nozzle, the extending end of said nozzle being so disposed in said chamber that it is in cooperating relationship with the control member so that the control member is operable to control fluid flow therethrough.

4. A pilot valve comprising: a valve body having a chamber therein adapted to be connected to the operating chamber of a valve to be controlled and a pair of spaced, generally cylindrical openings extending into said body and communicating with said chamber; a pair of generally cylindrical bushings each formed of a relatively soft deformable material and having a diameter smaller than the diameter of said openings but each having an outwardly extending annular flange with a diameter greater than said openings, each of said bushings further having a relatively small opening extending therethrough; a pair of fluid nozzles each consisting of a length of relatively hard, thin-walled hollow tubing, each of said nozzles being press-fitted into the opening in one of said bushings to form a fluid-tight seal therewith and having one end extending beyond one end of the bushing, each of said bushings being press-fitted into one of the openings in said body so that the flanges on said bushings form a fluid-tight seal with said body and with the extending end of the nozzle mounted therein extending a predetermined distance into said chamber; means adapted to connect the interior of said nozzles to a source of fluid pressure; means adapted to connect the interior of the other of said nozzles to a low pressure area; and closure means operatively associated with said nozzles and operable to control fluid flow therethrough.

5. The pilot valve of claim 4 wherein said bushings are formed of aluminum and said nozzles are relatively short pieces of surgical steel tubing.

6. In a pilot valve of the type including a body having a chamber therein and a pair of spaced fluid nozzles in the chamber adapted to be alternately opened and closed by a control member, the improved control member and operator therefore comprising: an armature formed of a relatively flat piece of magnetic material and with a length greater than the distance between the fluid nozzles, said armature having a pair of openings therethrough spaced so that each opening is adapted to receive the end of one of the nozzles; a strip of relatively thin, readily deformable material disposed along one side of said armature and overlying said openings; a retaining member disposed adjacent said deformable material and secured to said armature with said deformable material sandwiched tightly between said retaining member and said armature, said retaining member having a dimple extending away from said deformable material to leave a void therebehind opposite each of the openings in said armature; means pivotally mounting said armature in the chamber in cooperating relation with the nozzles; yieldable spring means urging said armature to a pivotal position wherein the end of one of the nozzles extends through one of the openings in said armature and is closed by the deformable material therein and the other of the nozzles is open; and electromagnetic means operable to move said armature to another pivotal position wherein the said one nozzle is opened and the said other nozzle extends into the other opening in said armature and is closed by the deformable material therein.

7. The method of making a pilot control valve of the type having a body with a chamber therein, a fluid nozzle in the chamber and a control member adapted to cooperate with the nozzle to control the flow of fluid therethrough comprising the steps of: forming a cylindrical opening in the body and extending from the chamber in a position adjacent the position of the control member; pressing a piece of relatively hard, thin-walled tubing with a small central opening therethrough into a hollow bushing formed of a relatively soft and deformable material so that a fluid-tight seal is obtained between the bushing and the tubing and so that an end portion of the tubing extends from one end of the bushing; and forcing said bushing into the opening in the body to accomplish a fluid-tight fit between the bushing and the body and to position said end portion of the tubing in the chamber to provide a fluid nozzle disposed in a position to be cooperable with the control member.

References Cited by the Examiner

UNITED STATES PATENTS

| | | | |
|---|---|---|---|
| 2,464,945 | 3/1949 | Rouse | 251—30 X |
| 2,636,518 | 4/1953 | Strebel | 251—303 X |
| 2,825,360 | 3/1958 | Klee | 137—625.2 |

M. CARY NELSON, *Primary Examiner.*

MARTIN P. SCHWADRON, *Examiner.*